(12) United States Patent
Wehrli et al.

(10) Patent No.: US 7,607,873 B2
(45) Date of Patent: Oct. 27, 2009

(54) CONCRETE PANEL TRAILER ASSEMBLY WITH STRUT-MOUNTED WHEELS

(75) Inventors: Richard F. Wehrli, Naperville, IL (US); Joseph Gallione, Naperville, IL (US)

(73) Assignee: 21st Century Structures, LLC, Naperville, IL (US)

( * ) Notice: Subject to any disclaimer, the term of this patent is extended or adjusted under 35 U.S.C. 154(b) by 377 days.

(21) Appl. No.: 11/385,157

(22) Filed: Mar. 21, 2006

(65) Prior Publication Data

US 2007/0224009 A1 Sep. 27, 2007

(51) Int. Cl.
*B60P 7/08* (2006.01)

(52) U.S. Cl. .............................. 410/44; 410/32; 410/34; 410/45

(58) Field of Classification Search .................... 410/31, 410/32, 34, 38, 44, 45, 53, 54; 280/149.2, 280/404, 35, 656, 405.1, 491.2, 407, 407.1, 280/491.5, 412, 482, 478.1, 479.2, 2, 443, 280/103, 124.125

See application file for complete search history.

(56) References Cited

U.S. PATENT DOCUMENTS

| | | | |
|---|---|---|---|
| 4,397,476 A | * | 8/1983 | Bolyard et al. |
| 4,666,181 A | | 5/1987 | Wegner |
| 4,753,566 A | | 6/1988 | Wegner |
| 4,865,510 A | | 9/1989 | Wegner |
| 4,865,511 A | | 9/1989 | Wegner |
| 5,114,288 A | | 5/1992 | Langendorf et al. |
| 6,821,066 B2 | * | 11/2004 | Wehrli .......................... 410/32 |

OTHER PUBLICATIONS

Watson & Chalin Product Catalog, 2001 Watson & Chalin Manufacturing Inc.

* cited by examiner

*Primary Examiner*—Stephen Gordon
(74) *Attorney, Agent, or Firm*—McAndrews, Held & Malloy, Ltd.

(57) ABSTRACT

A trailer assembly for transporting one or more vertically-oriented panels includes a frame having front and rear sections, a first set of lower crossbeams extending laterally across the front section of the frame, and a second set of lower crossbeams extending laterally across the rear section of the frame. The crossbeams provide vertical support for the panel(s). A hitch extending from the front section of the frame is attachable to a towing vehicle. A set of front vertical members extend upwardly from either the hitch or the frame. A set of front crossbeams extend laterally between the front vertical members and a set of rear crossbeams extend laterally between the rear vertical members. The front and rear crossbeams impede longitudinal movement of the panel(s). A set of wheels axially mounted on struts extend laterally from oppositely facing sides of the rear section of the frame. In one embodiment, one of the front and rear sections is capable of telescoping within the other section to vary the frame length.

7 Claims, 6 Drawing Sheets

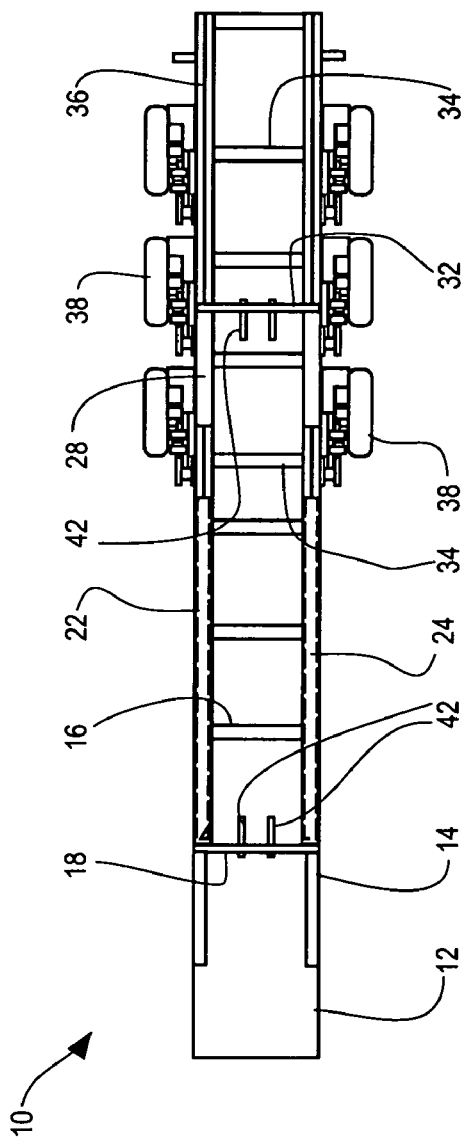
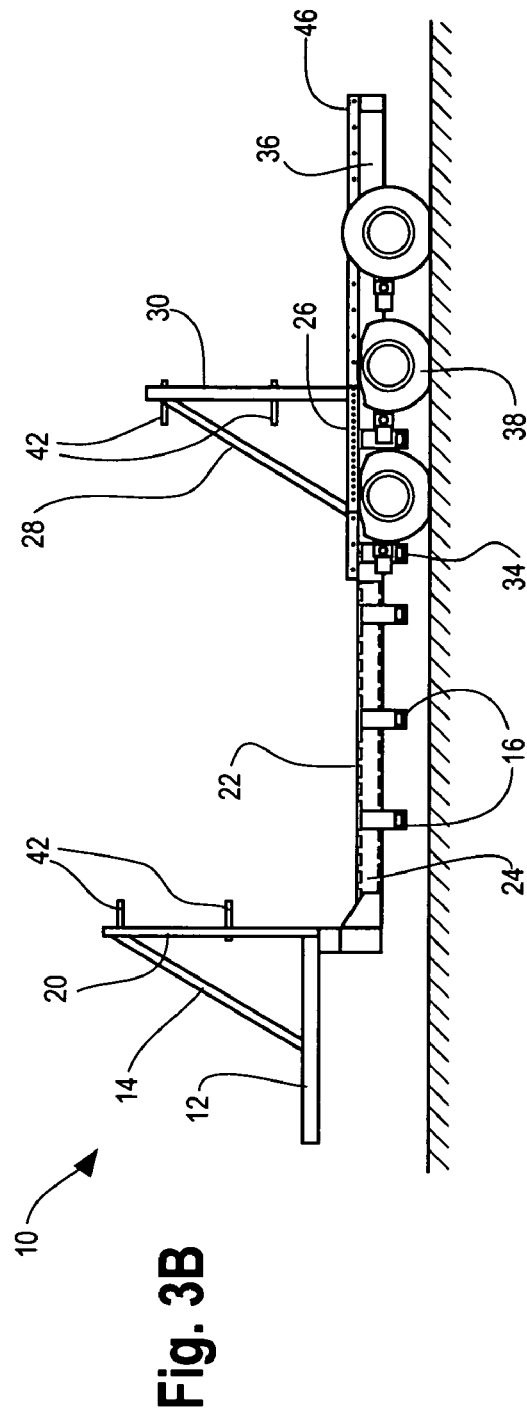
Fig. 3A
Fig. 3B

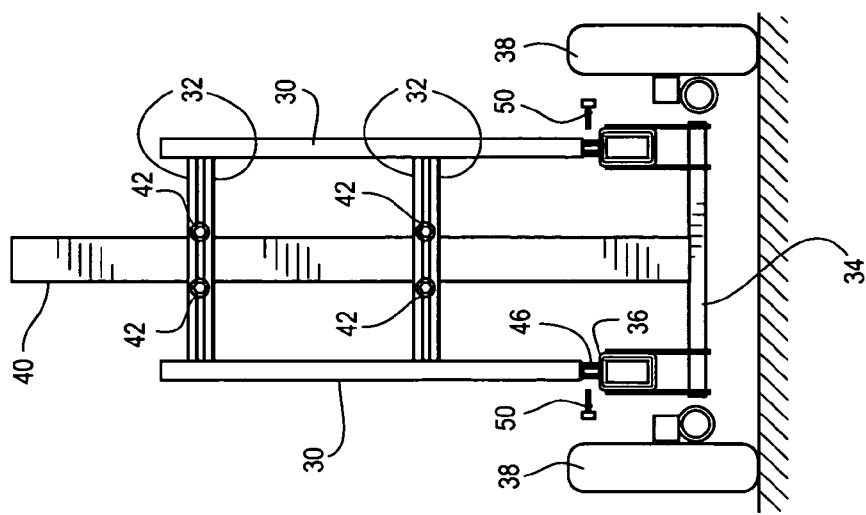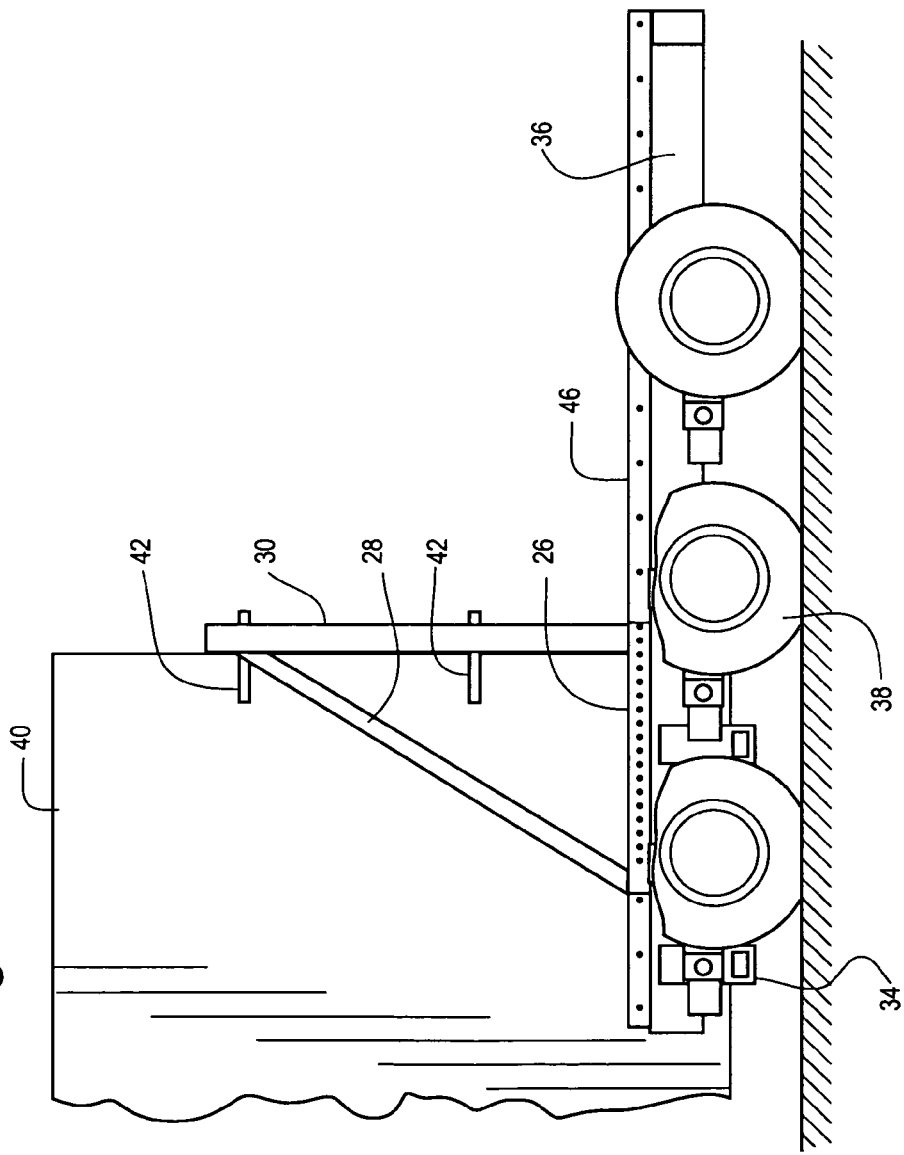

CONCRETE PANEL TRAILER ASSEMBLY WITH STRUT-MOUNTED WHEELS

FIELD OF THE INVENTION

The present invention relates to the transporting of vertically-oriented panels. In particular, the present invention provides an trailer assembly especially well suited for transporting precast concrete panels of varying sizes, such as those employed in the construction of prefabricated buildings.

BACKGROUND OF THE INVENTION

The handling, storing and shipping of large, heavy, vertically-oriented panels, such as concrete wall panels, can be hazardous and expensive due to the numerous times in which a panel must be lifted and moved. Heavy lifting equipment, such as cranes, are normally required to lift and move panels, not only within the in-factory panel manufacturing and storage areas, but also to lift the panels onto trailers for transporting the panels by tractor/trailer to a construction job site where the panels are to be installed.

Reducing the number of times a panel is handled reduces the associated cost, not only in terms of decreasing the number of times that lifting equipment is mobilized to lift a panel, but also because the hazards to the panel (and the handlers) that impacts and stresses from the lifting and moving process can impose on the panel. Reducing the instances in which such impacts and stresses are imposed can reduce damage to the panel and also reduce the exposure of handlers to safety risks associated with damaged panels. In this regard, precast concrete wall panels typically have reinforcing steel bars or rods that extend only in the vertical direction when the panel is oriented vertically, thus preventing the panel from being stored and shipped flat due to the risk of breakage to the panel if impacts and/or stresses are imposed to the unreinforced regions of the panels and/or in a direction that the reinforcing bars cannot readily counteract.

Conventional trailers employed in the transportation of large, heavy, vertically-oriented panels are themselves large, mechanically complicated and expensive. Conventional tractor/trailer assemblies for the transportation of concrete panels are generally designed to transport the panels in a vertically upright position. In addition, panels of a large height (for example, up to 12 feet tall or more) require transporting, and governmental regulations limit the height to which transported material can extend above the roadway when hauled by a vehicle.

Conventional trailers are limited in their ability to transport or store panels of exceptionally large sizes. Specifically, conventional trailers are limited to panels of maximum lengths due to a combination of factors, including the presence of rear wheel axles and the inability of the trailer to expand. Rear wheel axles extending across the entire width of current trailers restrict maximum panel lengths, as panels generally are unable to extend past rear wheel axles. Trailers of fixed lengths are similarly unable to transport or store panels exceeding the fixed length of the trailer.

The present combination trailer and storage rack assembly overcomes at least some of the foregoing shortcomings associated with conventional techniques for handling, storing and transporting large, heavy, vertically-oriented panels, particularly concrete wall panels. The present trailer rack assembly represents a comprehensive material handling solution that improves in-factory handling, storage and inventory operations, and also improves over-the-road transportation and delivery of large, heavy, vertically-oriented panels to a construction jobsite.

SUMMARY OF THE INVENTION

The present trailer assembly provides an assembly for transporting at least one vertically-oriented panel. The assembly comprises (a) a frame including front and rear sections, (b) a first plurality of lower crossbeams extending laterally across the front section of the frame, the first plurality of lower crossbeams providing vertical support for the at least one panel, (c) a second plurality of lower crossbeams extending laterally across the rear section of the frame, the second plurality of lower crossbeams providing vertical support for the at least one panel, and (d) a plurality of wheels axially mounted on struts extending laterally from oppositely facing sides of the rear section of the frame.

The present trailer assembly also provides a method of transporting at least one vertically-oriented panel mounted on a trailer, where the trailer comprises a frame vertically supporting and impeding movement of the panel in the lateral and longitudinal directions. The method includes axially mounting a plurality of wheels on struts extending laterally from opposite facing sides of the frame so that at least a portion of the frame extends below the wheel axes.

BRIEF DESCRIPTION OF THE DRAWINGS

FIG. 3*a* is a top view of an embodiment of the present trailer assembly, shown in a retracted position.

FIG. 3*b* is a side elevation view of an embodiment of the present trailer assembly, shown in a retracted position.

FIG. 4*a* is a side elevation view of an embodiment of the present strut-mounted wheels extending laterally from opposite sides of the present trailer assembly.

FIG. 4*b* is a rear elevation view of an embodiment of the present strut-mounted wheels extending laterally from opposite sides of the present trailer assembly.

DETAILED DESCRIPTION OF PREFERRED EMBODIMENT(S)

Figure 1A:
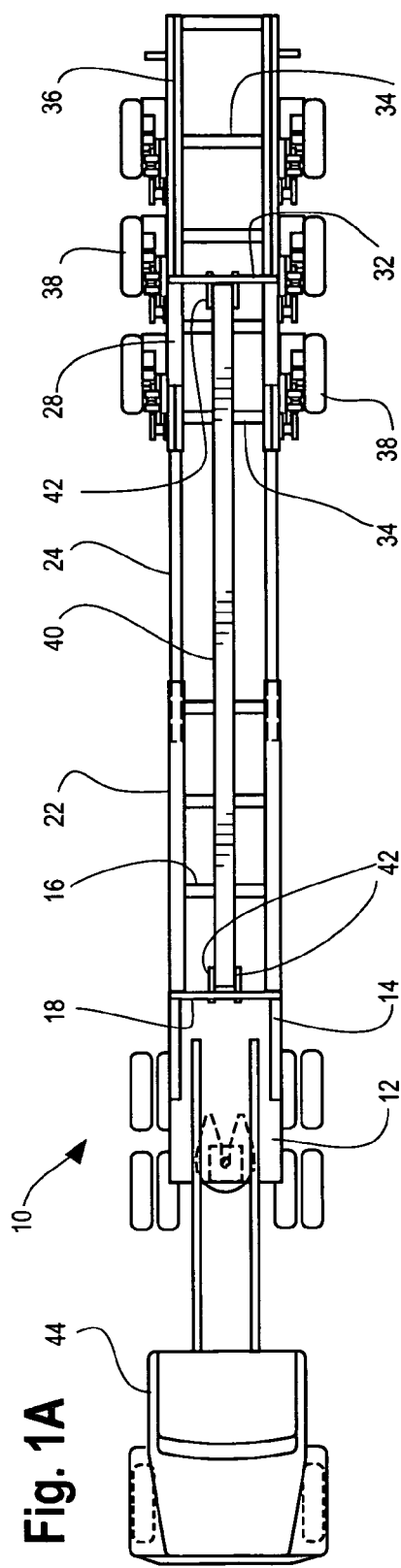
FIG. 1*a* is a top view of an embodiment of the present trailer assembly for transporting one or more vertically-oriented panels, shown in an extended position and connected to a towing vehicle.
Figure 1B:
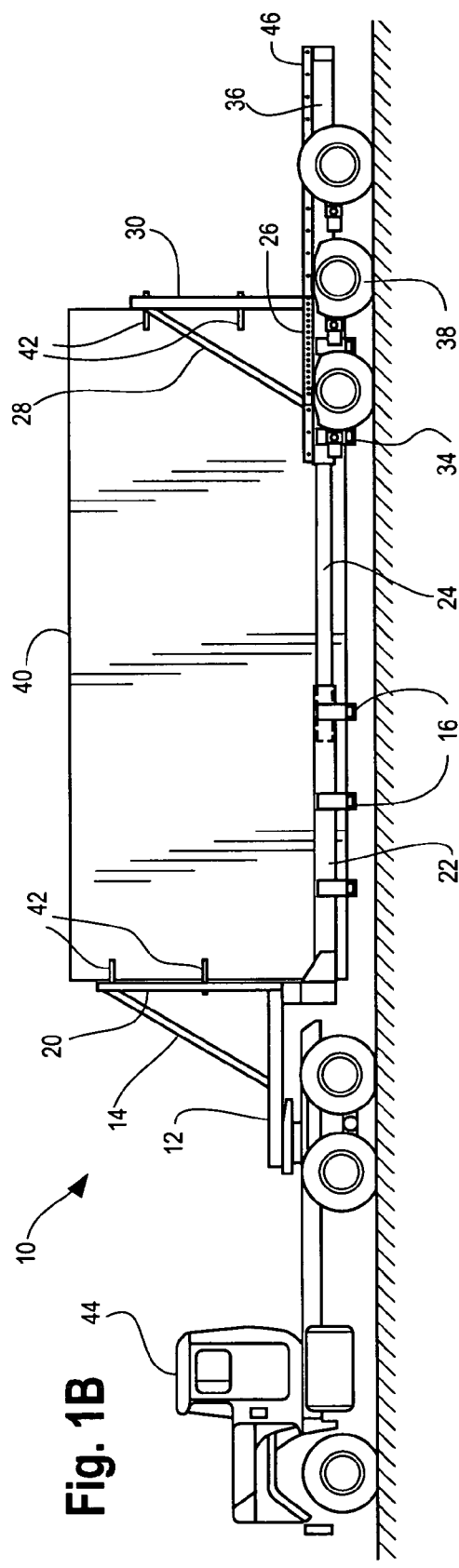
FIG. 1*b* is a side elevation view of an embodiment of the present trailer assembly for transporting one or more vertically-oriented panels, shown in an extended position and connected to a towing vehicle.
Figure 2A:
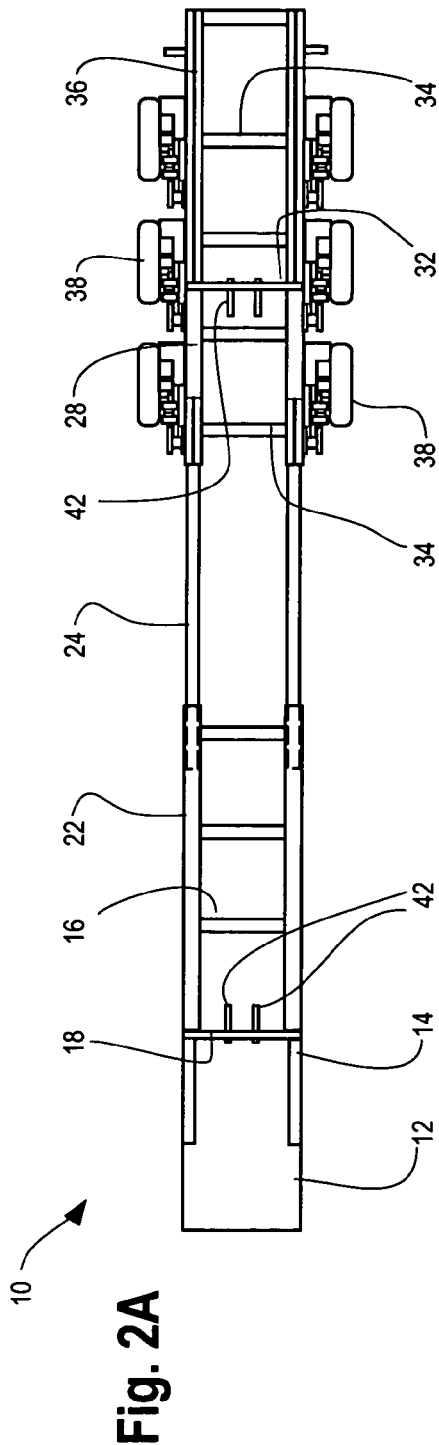
FIG. 2*a* is a top view of an embodiment of the present trailer assembly, shown in an extended position.
Figure 2B:
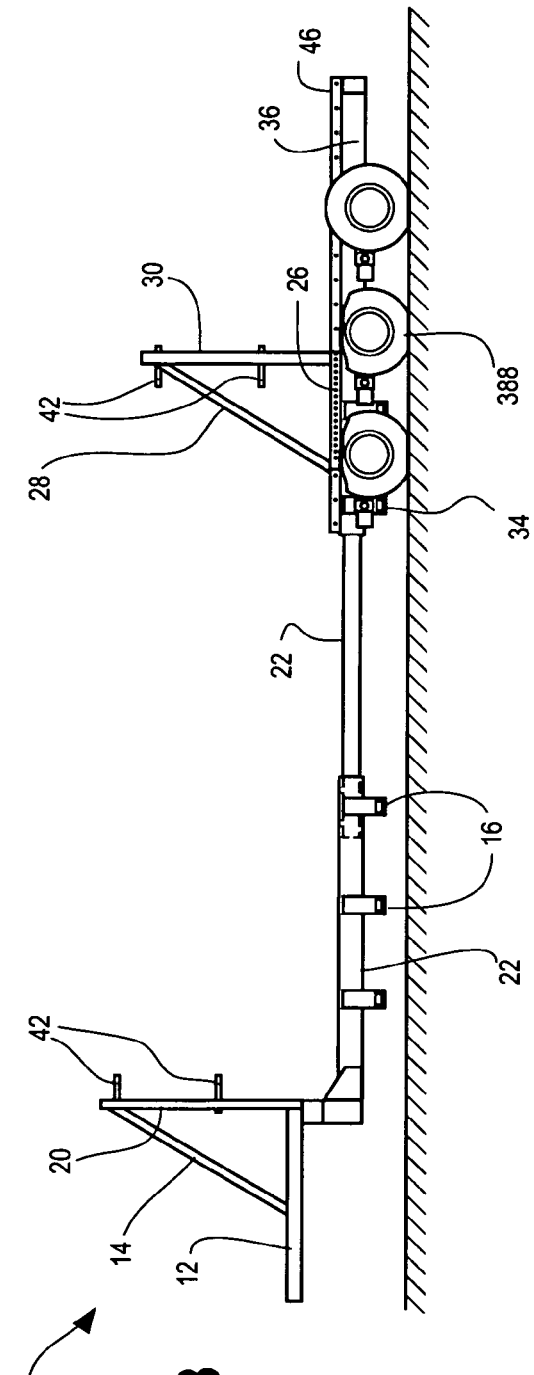
FIG. 2*b* is a side elevation view of an embodiment of the present trailer assembly, shown in an extended position.

Turning to the figures, FIG. 1*a* is a top view of an embodiment of the present trailer assembly 10 for transporting one or more vertically-oriented panels 40, shown in an extended position and connected to a towing vehicle 44. FIG. 1*b* is a side elevation view of an embodiment of the present trailer assembly 10 for transporting one or more vertically-oriented panels 40, shown in an extended position and connected to towing vehicle 44. FIG. 2a is a top view of an embodiment of the present trailer assembly, shown in an extended position. FIG. 2b is a side elevation view of an embodiment of the present trailer assembly, shown in an extended position.

Trailer assembly 10 comprises a hitch 12, one or more angled supports 14, 28, one or more lower crossbeams 16, 34, one or more upper crossbeams 18, 32, one or more vertical members 20, 30, a front frame 22, a rear frame 24, one or more rear base members 36, and a plurality of wheels 38.

Trailer assembly 10 can be used to transport one or more panels 40. Panel 40 can include two oppositely facing outwardly projecting major planar surfaces and exhibiting fragility to impacts directed upon at least one of the major planar surfaces. As such, panel 40 can comprise a large, heavy, vertically-oriented panel, such as a concrete wall panel for example. Panel 40 can comprise a precast concrete wall panel, typically including reinforcing steel bars or rods that extend only in the vertical direction when the panel is oriented vertically, for example. In addition, a plurality of panels 40 may be stored or transported using trailer assembly 10.

A front portion of assembly 10 comprises a first plurality of lower crossbeams 16 extending laterally from opposite sides of front frame section 22. Lower crossbeams 16 provide vertical support for panel 40. Lower crossbeams 16 may be removably connected to front frame section 22. Lower crossbeams 16 may therefore be arranged closer together or farther apart, depending on the requirements for vertical support of panel 40, for example. In this way, if panel 40 requires additional vertical support below a given portion of panel 40, lower crossbeams 16 may be moved closer together, for example.

Alternatively, lower crossbeams 16 may be fixed in their connection to front frame section 22. Lower crossbeams 16 may therefore be fixed in their arrangement in proximity to each other, for example.

A hitch 12 can extend from front frame section 22. Hitch 12 may be removably or permanently attached to front frame section 22 to allow the assembly 10 to be connected to a towing vehicle 44. Assembly 10 may therefore be removed from one towing vehicle 44 and placed for temporary storage at a construction or storage site, for example, or may be re-attached to a second towing vehicle 44.

Towing vehicle 44 can comprise a semi-truck, as illustrated in FIGS. 1a and 1b. Towing vehicle 44 can include anything capable of transporting panel 40 or any other item or persons from one location to another, for example.

FIG. 1b is a side elevation view of trailer assembly 10 connected to towing vehicle 44 in an extended position. FIG. 1b illustrates a plurality of front vertical members 20, a plurality of front angled supports 14, a plurality of rear vertical members 30, and a plurality of rear angled supports 28.

Front vertical members 20 extend upwards from one of hitch 12 and the front frame section 22. Front vertical members 20 may be attached to hitch 12 or front frame section 22 in either a fixed or removable nature. For example, front vertical members 20 may be welded to hitch 12 or front frame section 22, or may removable from hitch 12 or front frame section 22.

Front vertical members 20 can be supported by a plurality of front angled supports 14. Front angled supports 14 can connect the top of front vertical members 20 with hitch 12. Alternatively, front angled supports 14 can connect any portion of front vertical members 20 with hitch 12.

Figure 5:
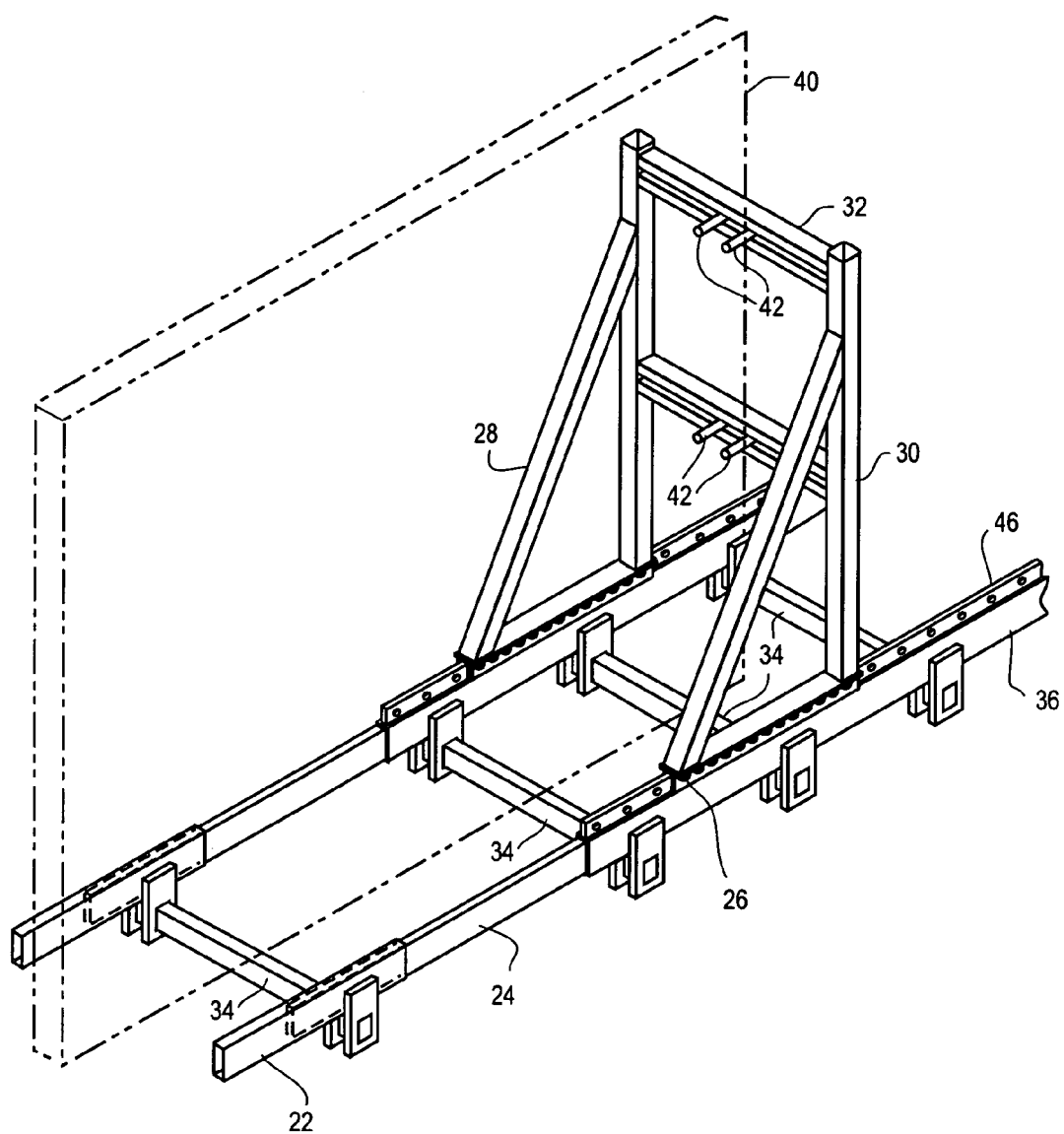
FIG. 5 is a perspective view of an embodiment of the rear frame of the presently described trailer assembly.

FIG. 4a illustrates a side elevation view of an embodiment of the present strut-mounted wheels extending laterally from opposite sides of the present trailer assembly. FIG. 4b illustrates a rear elevation view of an embodiment of the present strut-mounted wheels extending laterally from opposite sides of the present trailer assembly. FIG. 5 illustrates a perspective view of an embodiment of the rear frame of the presently described trailer assembly. In a preferred embodiment, rear vertical members 30 extend upwards from one or more rear guide members 26. In this embodiment, rear base members 36 each comprise a rail 46. Rear guide members 26 are configured to slide or move in a longitudinal direction along rails 46. By doing so, the longitudinal position of rear vertical members 30 (and crossbeams 32) can be adjusted for panels 40 of varying length.

One or more rails 46 can include one or more holes. In addition, one or more rear base members 36 can also include one or more holes. In order to fix or hold a longitudinal position of rear guide members 26, a pin 50 can be placed through a hole in rail 46 and a hole in rear guide member 26. A plurality of pins 50 can be placed through a plurality of holes in rails 46 and rear guide members 26.

In another embodiment of the presently described trailer assembly 10, front vertical members 20 can be moveable in a manner similar to rear vertical members 30 as described above. For example, front vertical members 20 can be positioned on front base members (not shown, but similar to rear base members 36). The front base members can be moveable along one or more rails of hitch 12 (not shown, but similar to rails 46 of rear base members 36 described above). One or more rails of hitch 12 can include one or more holes. One or more front base members can also include one or more holes. In order to fix or hold a longitudinal position of front base members, one or more pins can be employed, as described above.

Rear vertical members 30 can be supported by a plurality of rear angled supports 28. Rear angled supports 28 can connect rear vertical members 30 with rear guide members 26. Rear angled supports 28 can connect the top of rear vertical members 30 with rear guide members 26. Alternatively, rear angled supports 28 can connect any portion of rear vertical members 30 with rear guide members 26.

A plurality of front crossbeams 18 and a plurality of rear crossbeams 32 are illustrated in FIGS. 1a, 2a and 3a. Rear crossbeams 32 are also illustrated in FIG. 4b. Front crossbeams 18 extend laterally between front vertical members 20. Front crossbeams 18 can impede longitudinal movement of panel 40. For example, if during forward transportation of panel 40 towing vehicle 44 stops or slows down, panel 40 may otherwise continue in a forward direction. Front crossbeams 18 can act to stop or impede panel 40 from continuing to move forward. Front crossbeams 18 can be configured as illustrated with rear crossbeams 32 in FIG. 4b. For example, a plurality of front crossbeams 18 can be positioned between front vertical members 20. However, a greater or smaller number of crossbeams 18 can also be used than is illustrated in FIG. 4b.

Rear crossbeams 32 extend laterally between rear vertical members 30. Rear crossbeams 32 can impede longitudinal movement of panel 40. For example, if during forward transportation of panel 40 towing vehicle 44 accelerates, panel 40 may begin to move in a rearward direction relative to assembly 40. Rear crossbeams 32 can then act to stop or impede panel 40 from moving in a rearward direction.

In a preferred embodiment of assembly 10, a plurality of pins 42 can be positioned between a plurality of front crossbeams 18 and between a plurality of rear crossbeams 32. Pins 42 can be the same as or different than pins 50 described above. Pins 42 can be useful to stop or impede lateral movement of panels 40. Pins 42 can be held in place between front crossbeams 18 by placing front crossbeams 18 close enough together to prevent pins 42 from moving. Similarly, pins 42 can be held in place between rear crossbeams 32 by placing rear crossbeams 32 close enough together to prevent pins 42 from moving. Pins 42 can be re-positioned in a lateral direction in order to accommodate thicker or thinner panels 40.

In another embodiment, pins 42 can be placed in position by providing a plurality of holes (not shown) in front crossbeams 18 and/or rear crossbeams 32. Pins 42 can be placed through front crossbeams 18 and/or rear crossbeams 32 so as to accommodate thicker or thinner panels 40.

Pins 42 can provide lateral support to panel 40 to impede lateral movement of panel 40. For example, during transportation of panel 40, turns made by towing vehicle 44 or shifts in wind may cause panel 40 to move laterally relative to assembly 10. Pins 42 can therefore provide lateral support to panel 40.

In a preferred embodiment of the presently described trailer assembly 10, front frame section 22 and rear frame section 24 are capable of telescoping within one another to vary the overall length of assembly 10. As illustrated in FIGS. 1a, 1b, 2a, 2b, 3a and 3b, rear frame section 24 can be inserted within front frame section 22 to increase and decrease the length of assembly 10. However, front frame section 22 can also telescope within rear frame section 24.

The position of rear frame section 24 with respect to front frame section 22 can be temporarily fixed by a friction fit between front and rear sections 22, 24. In another embodiment, one or more holes can exist in front and rear sections 22, 24. The position of rear frame section 24 with respect to front frame section 22 can then be temporarily fixed by placing one or more pins through one or more holes in front and rear sections 22, 24.

In another embodiment of the presently described trailer assembly 10, assembly 10 is fixed in length. That is, front and rear sections 22, 24 do not telescope within one another to adjust the overall length of assembly 10. In such an embodiment, front and rear sections 22, 24 can be formed of a single frame or can be fixed together so as not to allow any change in the length of assembly 10. Such a fixed length trailer assembly 10 may be preferred for a lighter assembly 10 and/or for a more compact assembly 10 used to transport building panels in tight locations, such as city streets, for example.

In a preferred embodiment of the presently described assembly 10, wheels 38 can be embodied in any type of strut-mounted wheels. For example, wheels 38 can be axially mounted on struts extending laterally from oppositely facing sides of rear frame section 24. In another example, wheels 38 can each be embodied in a single wheel attached to an axle that does not extend across the entire width of rear section 24. Wheels 38 can be mounted so that at least a portion of rear frame 24 extends below the wheel 38 axles. For example, FIG. 4b illustrates the wheels 38 in accordance with the presently described assembly 10. Wheels 38 are strut mounted so that no axle extending laterally across the width of assembly 10 exists. This can be preferable so that panels 40 of a large height can be more easily transported. By eliminating the axle extending laterally across assembly 10 from one wheel to another, strut mounted wheels 38 permit panels 40 to ride lower in assembly 10 to reduce the overall height of assembly 10 and panel 40.

In another embodiment, wheels 38 can be embodied in the wheels and rear wheel axles disclosed in Wegner, U.S. Pat. No. 4,666,181. The disclosure of Wegner, including the figures and description of the wheels and rear wheel axles, is incorporated herein by reference in its entirety.

In another embodiment, wheels 38 can be connected by any commercially available drop axle or offset axle. A drop axle or offset axle includes an axle that connects two wheels 38 as an axle extending laterally across assembly 10 at a given offset below the center point of wheels 38. For example, a drop or offset axle can be 6, 8 or 10 inches (or more) below the center of wheels 38. Examples of suitable drop or offset axle devices are available from Watson and Chalin Manufacturing, Inc.

Figure 7:
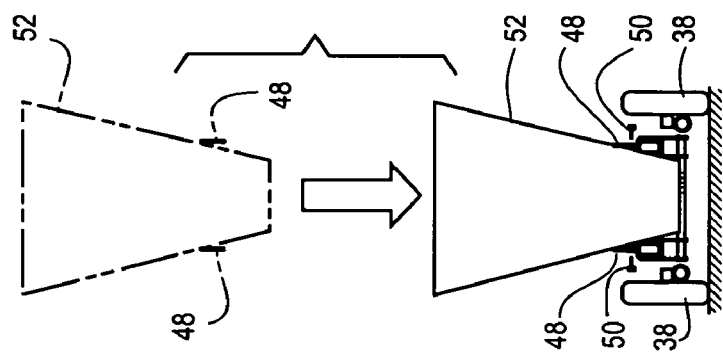
FIG. 7 illustrates a rear elevation view of an embodiment of the presently described trailer assembly with a plurality of hoppers.
Figure 6:
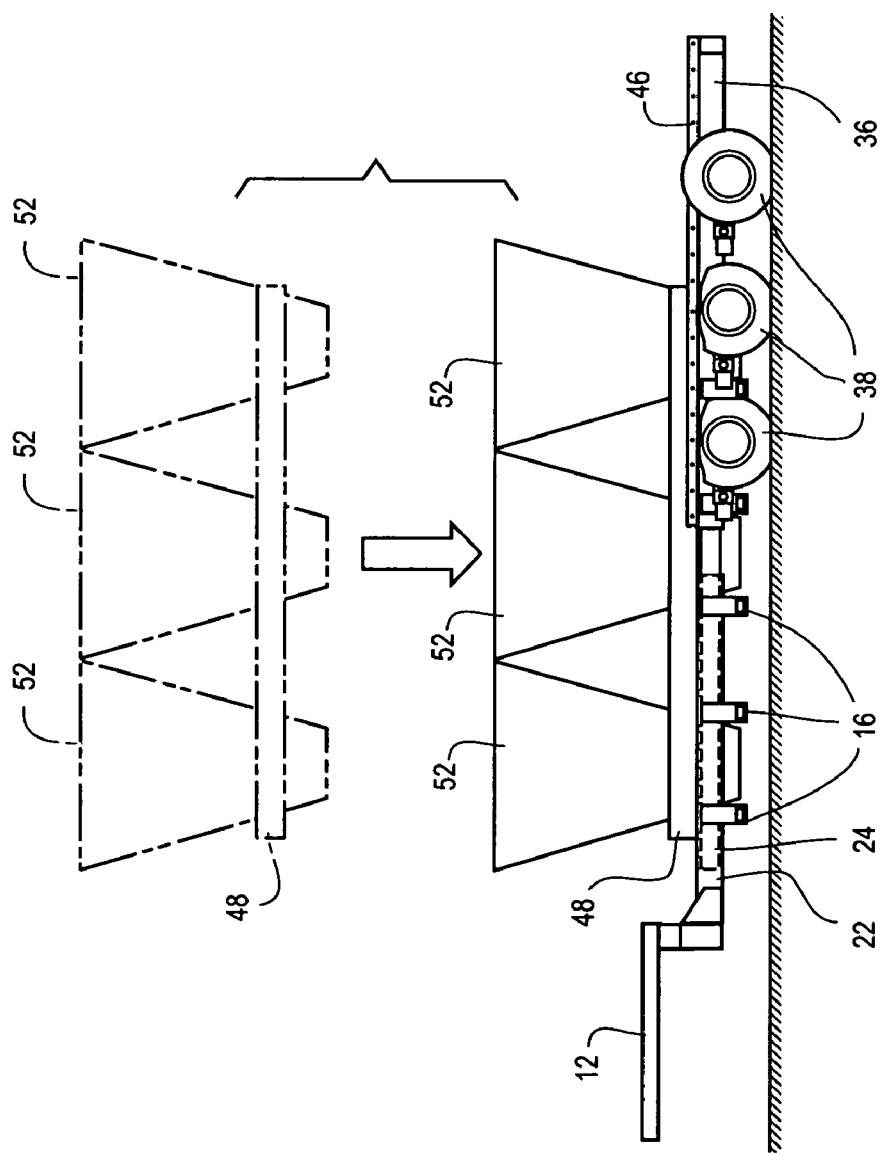
FIG. 6 illustrates a side elevation view of an embodiment of the presently described trailer assembly with a plurality of hoppers.

In an embodiment of the presently described trailer assembly, assembly 10 is configured to transport items or objects other than panels 40. FIGS. 6 and 7 illustrate hoppers 52 attached to a bracket 48 and transported using assembly 10 in accordance with an embodiment of the presently described trailer assembly. Hoppers 52 can be connected to bracket 48 in order to allow hoppers 52 to be transported in trailer assembly 10. For example, once one or more hoppers 52 are connected to bracket 48, bracket 48 can be connected to one or more of front and rear sections 22, 24 of trailer assembly 10. While three hoppers 52 are shown in the figures, a larger or smaller number of hoppers 52 can be connected to bracket 48.

Hoppers 52 can be removably attached to bracket 48. For example, hoppers 52 can be connected to bracket 48 using any known technique, such as by using nuts, bolts, screws, and the like.

Alternatively, hoppers 52 can be fixed to bracket 48. For example, hoppers 52 can be welded to bracket 48.

Hoppers 52 can be used to transport a wide range of materials. For example, hoppers 52 can be used to transport aggregate to a concrete batch plant. Hoppers 52 can be formed of a metal such as aluminum, for example.

Hoppers 52 can include a gate at the bottom of each hopper 52. The gate can be manually or automatically opened to allow material or objects contained in hopper 52 to fall out of the bottom of hopper 52 through the open gate.

Bracket 48 can be removably attached to front 22 and/or rear 24 section of trailer assembly 10. For example, bracket 48 can be connected to front and/or rear sections 22, 24 using any known technique, such as by using nuts, bolts, screws, and the like. In a preferred embodiment of the presently described trailer assembly, bracket 48 is connected to assembly 10 using one or more pins 50 and one or more holes in rail 46 of rear base members 36. As illustrated in FIGS. 6 and 7, bracket 48 can be lowered so as to rest on front and rear frame sections 22, 24. Bracket 48 can include one or more holes on each side of hoppers 52. In this way, one or more holes in bracket 48 can be lined up with one or more holes in rail 46. One or more pins 50 can then be placed through the holes to hold bracket 48 and hoppers 52 in place.

Alternatively, bracket 48 can be fixed to front and/or rear sections 22, 24. For example, bracket 48 can be welded to front and/or rear sections 22, 24. While FIG. 6 illustrates rear frame section 24 within front frame section 22 so as to provide a shortened assembly 10 transporting hoppers 52, front and rear sections 22, 24 can also be positioned so as to provide a longer assembly 10 (as described above) while transporting a larger or smaller number of hoppers 52 and/or a larger or smaller bracket 48.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A trailer assembly for transporting at least one vertically-oriented panel, the trailer assembly comprising:
   (a) a frame including front and rear sections;
   (b) a first plurality of lower crossbeams extending laterally across the front section of the frame, the first plurality of lower crossbeams providing vertical support for the at least one panel;
   (c) a second plurality of lower crossbeams extending laterally across the rear section of the frame, the second plurality of lower crossbeams providing vertical support for the at least one panel;
   (d) a plurality of wheels axially mounted on struts extending laterally from oppositely facing sides of the rear section of the frame;
   (e) a plurality of front vertical members extending upwardly from a hitch; and
   (f) a plurality of front crossbeams extending laterally between the front vertical members, the plurality of front crossbeams impeding longitudinal movement of the at least one panel.

2. The trailer assembly of claim 1, further comprising:
   (g) a plurality of rear vertical members extending upwardly from at least one rear guide member; and
   (h) a plurality of rear crossbeams extending laterally between the rear vertical members, the plurality of rear crossbeams impeding longitudinal movement of the at least one panel.

3. The trailer assembly of claim 2, further comprising:
   (i) a plurality of rear base members each comprising a rail, wherein the at least one rear guide member is capable of being moved in a longitudinal direction along at least one of the rails.

4. The trailer assembly of claim 3, wherein at least one of the rails has at least one hole formed therein and the at least one rear guide member has at least one hole formed therein.

5. The trailer assembly of claim 4, further comprising at least one pin capable of being placed through at least one hole formed in one of the rails and at least one hole formed in the at least one rear guide member to fix the at least one rear guide member longitudinal position.

6. The trailer assembly of claim 1, further comprising a plurality of front angled supports connecting the front vertical members with the hitch.

7. The trailer assembly of claim 3, further comprising a plurality of rear angled supports connecting the rear vertical members with the rear base members.

* * * * *

UNITED STATES PATENT AND TRADEMARK OFFICE
CERTIFICATE OF CORRECTION

| | |
|---|---|
| PATENT NO. | : 7,607,873 B2 |
| APPLICATION NO. | : 11/385157 |
| DATED | : October 27, 2009 |
| INVENTOR(S) | : Wehrli et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Twelfth Day of October, 2010

David J. Kappos
*Director of the United States Patent and Trademark Office*